(12) United States Patent
Park

(10) Patent No.: US 7,849,358 B2
(45) Date of Patent: Dec. 7, 2010

(54) RECORDING MEDIUM, AND METHOD AND APPARATUS OF RECORDING AND REPRODUCING DATA ON THE SAME

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 152 days.

(21) Appl. No.: 12/320,443

(22) Filed: Jan. 27, 2009

(65) Prior Publication Data

US 2009/0141599 A1 Jun. 4, 2009

Related U.S. Application Data

(63) Continuation of application No. 11/224,107, filed on Sep. 13, 2005, now Pat. No. 7,500,137.

(60) Provisional application No. 60/609,260, filed on Sep. 14, 2004, provisional application No. 60/610,222, filed on Sep. 16, 2004.

(30) Foreign Application Priority Data

Nov. 1, 2004 (KR) ............ 10-2004-0087950

(51) Int. Cl.
*G06F 11/00* (2006.01)
(52) U.S. Cl. ............... 714/8; 714/5
(58) Field of Classification Search .......... None
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi | |
| 4,807,205 A | 2/1989 | Picard | |
| 4,963,866 A | 10/1990 | Duncan | |
| 5,068,842 A | 11/1991 | Naito | |
| 5,111,444 A | 5/1992 | Fukushima et al. | |
| 5,210,734 A | 5/1993 | Sakurai | |

(Continued)

FOREIGN PATENT DOCUMENTS

CN 1134017 10/1996

(Continued)

OTHER PUBLICATIONS

Office Action issued Jul. 25, 2008, by the U.S. Patent and Trademark Office in corresponding U.S. Appl. No. 11/158,358.

(Continued)

*Primary Examiner*—Marc Duncan
(74) *Attorney, Agent, or Firm*—Harness, Dickey & Pierce, P.L.C.

(57) ABSTRACT

An apparatus of recording data on a recording medium includes a pickup unit and a microcomputer. The pickup unit records data in a plurality of data frames included in a cluster. The microcomputer controls the pickup unit to record status information within the cluster, which indicates a status of the data being recorded in each data frame. In addition, the microcomputer further controls the pickup unit to record previous location information within the cluster when the cluster is determined to be a replacement cluster. The previous location information indicates a previous location of an original cluster associated with the replacement cluster.

29 Claims, 10 Drawing Sheets

U.S. PATENT DOCUMENTS

| | | | |
|---|---|---|---|
| 5,235,585 A | 8/1993 | Bish et al. | |
| 5,237,553 A | 8/1993 | Fukushima et al. | |
| 5,247,494 A | 9/1993 | Ohno et al. | |
| 5,319,626 A | 6/1994 | Ozaki et al. | |
| 5,404,357 A | 4/1995 | Ito et al. | |
| 5,418,767 A | 5/1995 | Gaudet et al. | |
| 5,442,611 A | 8/1995 | Hosaka | |
| 5,448,728 A | 9/1995 | Takano et al. | |
| 5,475,820 A | 12/1995 | Natrasevschi et al. | |
| 5,481,519 A | 1/1996 | Hosoya | |
| 5,495,466 A | 2/1996 | Dohmeier et al. | |
| 5,526,335 A | 6/1996 | Tamegai | |
| 5,528,571 A | 6/1996 | Funahashi et al. | |
| 5,553,045 A | 9/1996 | Obata | |
| 5,577,194 A * | 11/1996 | Wells et al. | 714/8 |
| 5,608,715 A | 3/1997 | Yokogawa et al. | |
| 5,644,539 A | 7/1997 | Yamagami et al. | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori | |
| 5,802,028 A | 9/1998 | Igarashi | |
| 5,805,536 A | 9/1998 | Gage et al. | |
| 5,848,038 A | 12/1998 | Igarashi | |
| 5,867,455 A | 2/1999 | Miyamoto et al. | |
| 5,878,020 A | 3/1999 | Takahashi | |
| 5,914,928 A | 6/1999 | Takahashi | |
| 5,930,815 A | 7/1999 | Estakhri et al. | |
| 5,940,702 A | 8/1999 | Sakao | |
| 6,058,085 A | 5/2000 | Obata | |
| 6,118,608 A | 9/2000 | Kakihara et al. | |
| 6,138,203 A | 10/2000 | Inokuchi et al. | |
| 6,160,778 A | 12/2000 | Ito et al. | |
| 6,189,118 B1 | 2/2001 | Sasaki et al. | |
| 6,233,654 B1 | 5/2001 | Aoki et al. | |
| 6,292,445 B1 | 9/2001 | Ito et al. | |
| 6,341,109 B1 | 1/2002 | Kayanuma | |
| 6,341,278 B1 | 1/2002 | Yamamoto et al. | |
| 6,373,800 B1 | 4/2002 | Takahashi | |
| 6,393,513 B2 | 5/2002 | Estakhri et al. | |
| 6,405,332 B1 | 6/2002 | Bando et al. | |
| 6,414,923 B1 | 7/2002 | Park et al. | |
| 6,447,126 B1 | 9/2002 | Hornbeck | |
| 6,466,532 B1 | 10/2002 | Ko | |
| 6,469,978 B1 | 10/2002 | Ohata et al. | |
| 6,477,126 B1 | 11/2002 | Park et al. | |
| 6,480,446 B1 | 11/2002 | Ko | |
| 6,493,301 B1 | 12/2002 | Park | |
| 6,493,302 B2 | 12/2002 | Takahashi | |
| 6,529,458 B1 | 3/2003 | Shin | |
| 6,542,450 B1 | 4/2003 | Park | |
| 6,564,345 B1 | 5/2003 | Kim et al. | |
| 6,581,167 B1 | 6/2003 | Gotoh et al. | |
| 6,594,209 B2 | 7/2003 | Ijtsma et al. | |
| 6,606,285 B1 | 8/2003 | Ijtsma et al. | |
| 6,615,363 B1 | 9/2003 | Fukasawa | |
| 6,631,106 B1 | 10/2003 | Numata et al. | |
| 6,633,724 B1 | 10/2003 | Hasegawa et al. | |
| 6,667,939 B1 | 12/2003 | Miyamoto | |
| 6,671,249 B2 | 12/2003 | Horie | |
| 6,697,306 B2 | 2/2004 | Sako | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama | |
| 6,766,418 B1 | 7/2004 | Alexander et al. | |
| 6,788,631 B1 | 9/2004 | Park et al. | |
| 6,795,389 B1 | 9/2004 | Nishiuchi et al. | |
| RE38,638 E | 10/2004 | Yonemitsu et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,845,072 B1 | 1/2005 | Weirauch | |
| 6,883,111 B2 | 4/2005 | Yoshida et al. | |
| 6,918,003 B2 | 7/2005 | Sasaki | |
| 6,934,236 B2 | 8/2005 | Lee et al. | |
| 6,999,398 B2 | 2/2006 | Yamamoto et al. | |
| 7,002,882 B2 | 2/2006 | Takahashi | |
| 7,027,059 B2 | 4/2006 | Hux et al. | |
| 7,027,373 B2 | 4/2006 | Ueda et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,327,654 B2 | 2/2008 | Hwang et al. | |
| 7,379,402 B2 | 5/2008 | Ko et al. | |
| 2001/0009537 A1 | 7/2001 | Park | |
| 2001/0011267 A1 | 8/2001 | Kihara et al. | |
| 2001/0026511 A1 | 10/2001 | Ueda et al. | |
| 2001/0043525 A1 | 11/2001 | Ito et al. | |
| 2002/0025138 A1 | 2/2002 | Isobe et al. | |
| 2002/0097665 A1 | 7/2002 | Ko et al. | |
| 2002/0097666 A1 | 7/2002 | Ko et al. | |
| 2002/0099950 A1 | 7/2002 | Smith | |
| 2002/0136118 A1 | 9/2002 | Takahashi | |
| 2002/0136134 A1 | 9/2002 | Ito et al. | |
| 2002/0136537 A1 | 9/2002 | Takahashi | |
| 2002/0159382 A1 | 10/2002 | Ohata et al. | |
| 2002/0161774 A1 | 10/2002 | Tol et al. | |
| 2002/0176341 A1 | 11/2002 | Ko et al. | |
| 2003/0072236 A1 | 4/2003 | Hirotsune et al. | |
| 2003/0095482 A1 | 5/2003 | Hung et al. | |
| 2003/0126527 A1 | 7/2003 | Kim et al. | |
| 2003/0135800 A1 | 7/2003 | Kim et al. | |
| 2003/0137909 A1 | 7/2003 | Ito et al. | |
| 2003/0137910 A1 | 7/2003 | Ueda et al. | |
| 2003/0142608 A1 | 7/2003 | Yamamoto et al. | |
| 2003/0149918 A1 | 8/2003 | Takaichi | |
| 2003/0173669 A1 | 9/2003 | Shau | |
| 2003/0198155 A1 | 10/2003 | Go et al. | |
| 2004/0001408 A1 | 1/2004 | Propps et al. | |
| 2004/0004917 A1 | 1/2004 | Lee | |
| 2004/0062159 A1 | 4/2004 | Park et al. | |
| 2004/0062160 A1 | 4/2004 | Park et al. | |
| 2004/0076096 A1 | 4/2004 | Hwang et al. | |
| 2004/0105363 A1 | 6/2004 | Ko et al. | |
| 2004/0114474 A1 | 6/2004 | Park et al. | |
| 2004/0120233 A1 | 6/2004 | Park et al. | |
| 2004/0125716 A1 | 7/2004 | Ko et al. | |
| 2004/0125717 A1 | 7/2004 | Ko et al. | |
| 2004/0136292 A1 | 7/2004 | Park et al. | |
| 2004/0145980 A1 | 7/2004 | Park et al. | |
| 2004/0158768 A1 | 8/2004 | Park et al. | |
| 2004/0174782 A1 | 9/2004 | Lee et al. | |
| 2004/0174785 A1 | 9/2004 | Ueda et al. | |
| 2004/0179445 A1 | 9/2004 | Park et al. | |
| 2004/0179458 A1 | 9/2004 | Hwang et al. | |
| 2004/0218488 A1 | 11/2004 | Hwang et al. | |
| 2004/0223427 A1 | 11/2004 | Kim et al. | |
| 2004/0246851 A1 | 12/2004 | Hwang et al. | |

| | | | | | |
|---|---|---|---|---|---|
| 2004/0257934 A1 | 12/2004 | Gotoh et al. | JP | 08-096522 | 4/1996 |
| 2005/0007910 A1 | 1/2005 | Ito et al. | JP | 08-147702 | 6/1996 |
| 2005/0008346 A1 | 1/2005 | Noguchi et al. | JP | 08-273162 | 10/1996 |
| 2005/0025007 A1 | 2/2005 | Park | JP | 09-145634 | 6/1997 |
| 2005/0047294 A1 | 3/2005 | Park | JP | 09-231053 | 9/1997 |
| 2005/0050402 A1 | 3/2005 | Koda et al. | JP | 09-270175 | 10/1997 |
| 2005/0052972 A1 | 3/2005 | Park | JP | 10-050005 | 2/1998 |
| 2005/0052973 A1 | 3/2005 | Park | JP | 10-050032 | 2/1998 |
| 2005/0055500 A1 | 3/2005 | Park | JP | 10-187356 | 7/1998 |
| 2005/0060489 A1 | 3/2005 | Park | JP | 10-187357 | 7/1998 |
| 2005/0068877 A1 | 3/2005 | Yeo | JP | 10-187358 | 7/1998 |
| 2005/0083740 A1 | 4/2005 | Kobayashi | JP | 10-187359 | 7/1998 |
| 2005/0083767 A1 | 4/2005 | Terada et al. | JP | 10-187360 | 7/1998 |
| 2005/0083830 A1 | 4/2005 | Martens et al. | JP | 10-187361 | 7/1998 |
| 2005/0195716 A1 | 9/2005 | Ko et al. | JP | 10-222316 | 8/1998 |
| 2005/0207262 A1 | 9/2005 | Terada et al. | JP | 11-110888 | 4/1999 |
| 2005/0289389 A1* | 12/2005 | Yamagami et al. ............. 714/8 | JP | 11-203792 | 7/1999 |
| 2006/0077827 A1 | 4/2006 | Takahashi | JP | 2000-40308 | 2/2000 |
| 2006/0195719 A1* | 8/2006 | Ueda et al. .................... 714/8 | JP | 2000-090588 | 3/2000 |
| 2006/0203635 A1 | 9/2006 | Ko et al. | JP | 2000-149449 | 5/2000 |
| 2006/0203638 A1 | 9/2006 | Ko et al. | JP | 2000-195178 | 7/2000 |
| 2006/0203684 A1 | 9/2006 | Ko et al. | JP | 2000-215612 | 8/2000 |
| 2006/0227694 A1 | 10/2006 | Woerlee et al. | JP | 2000-285607 | 10/2000 |
| 2007/0294571 A1* | 12/2007 | Park et al. ...................... 714/8 | JP | 2001-023317 | 1/2001 |
| 2008/0046780 A1* | 2/2008 | Shibuya et al. ................. 714/8 | JP | 2001-069440 | 3/2001 |
| | | | JP | 2001-110168 | 4/2001 |

FOREIGN PATENT DOCUMENTS

| | | |
|---|---|---|
| JP | 2001-351334 | 12/2001 |
| CN | 1140897 | 1/1997 |
| JP | 2001-357623 | 12/2001 |
| CN | 1227950 | 9/1999 |
| JP | 2002-015507 | 1/2002 |
| CN | 1273419 | 11/2000 |
| JP | 2002-015525 | 1/2002 |
| CN | 1338102 | 2/2002 |
| JP | 2002-056619 | 2/2002 |
| CN | 1675708 | 9/2005 |
| JP | 2002-215612 | 8/2002 |
| CN | 1685426 | 10/2005 |
| JP | 2002-245723 | 8/2002 |
| DE | 199 54 054 | 6/2000 |
| JP | 2002-288938 | 10/2002 |
| EP | 0 314 186 | 5/1989 |
| JP | 2002-329321 | 11/2002 |
| EP | 0 325 823 | 8/1989 |
| JP | 2002-352522 | 12/2002 |
| EP | 0 350 920 | 1/1990 |
| JP | 2003-030844 | 1/2003 |
| EP | 0 464 811 | 1/1992 |
| JP | 2003-536194 | 12/2003 |
| EP | 0 472 484 | 2/1992 |
| JP | 2005-535993 | 2/2004 |
| EP | 0 477 503 | 4/1992 |
| JP | 2004-280864 | 10/2004 |
| EP | 0 556 046 | 8/1993 |
| JP | 2004-280865 | 10/2004 |
| EP | 0 871 172 | 10/1998 |
| JP | 2005-004912 | 1/2005 |
| EP | 0 908 882 | 4/1999 |
| JP | 2005-538490 | 12/2005 |
| EP | 0 974 967 | 1/2000 |
| JP | 2005-538491 | 12/2005 |
| EP | 0 989 554 | 3/2000 |
| JP | 2006-519445 | 8/2006 |
| EP | 0 997 904 | 5/2000 |
| KR | 10-2004-0015602 | 2/2004 |
| EP | 1 026 681 | 8/2000 |
| KR | 2004-0015602 | 3/2004 |
| EP | 1 043 723 | 10/2000 |
| KR | 10-2004-0094301 | 11/2004 |
| EP | 1 132 914 | 9/2001 |
| RU | 2005-103626 | 9/2005 |
| EP | 1 143 444 A2 | 10/2001 |
| RU | 2005-127337 | 2/2006 |
| EP | 1 148 493 | 10/2001 |
| TW | 371752 | 10/1999 |
| EP | 1 152 414 | 11/2001 |
| TW | 413805 | 12/2000 |
| EP | 1 239 478 | 9/2002 |
| WO | WO 84/00628 | 2/1984 |
| EP | 1 274 081 | 1/2003 |
| WO | WO 96/30902 | 10/1996 |
| EP | 1 298 659 | 4/2003 |
| WO | WO 97/22182 | 6/1997 |
| EP | 1304698 | 4/2003 |
| WO | WO 00/54274 | 9/2000 |
| EP | 1 329 888 | 7/2003 |
| WO | WO 01/22416 | 3/2001 |
| EP | 1 347 452 | 9/2003 |
| WO | WO 01/93035 | 12/2001 |
| EP | 1 547 065 | 6/2005 |
| WO | WO 03/007296 | 1/2003 |
| EP | 1 564 740 | 8/2005 |
| WO | WO 03/025924 | 3/2003 |
| EP | 1 573 723 | 9/2005 |
| WO | WO 03/063165 A1 | 7/2003 |
| EP | 1 612 790 | 1/2006 |
| WO | WO 03/079353 | 9/2003 |
| EP | 1 623 422 | 2/2006 |
| WO | WO 03/105138 | 12/2003 |
| GB | 2 356 735 | 5/2001 |
| WO | WO 2004/015707 | 2/2004 |
| JP | 63-091842 | 4/1988 |
| WO | WO 2004/015708 | 2/2004 |
| JP | 01-263955 | 10/1989 |
| WO | WO 2004/019331 | 3/2004 |
| JP | 02-023417 | 1/1990 |
| WO | WO 2004/025648 | 3/2004 |
| JP | 02-152072 | 6/1990 |
| WO | WO 2004/025649 | 3/2004 |
| JP | 4-114371 | 4/1992 |
| WO | WO 2004/029668 | 4/2004 |
| JP | 05-274814 | 10/1993 |
| WO | WO 2004/029941 | 4/2004 |
| JP | 6-259886 | 9/1994 |
| WO | WO 2004/034396 | 4/2004 |
| JP | 06-349201 | 12/1994 |
| WO | WO 2004/036561 | 4/2004 |
| | | | WO | WO 2004/053872 | 6/2004 |

| WO | WO 2004/053874 | 6/2004 |
| WO | WO 2004/068476 | 8/2004 |
| WO | WO 2004/075180 | 9/2004 |
| WO | WO 2004/079631 | 9/2004 |
| WO | WO 2004/079731 | 9/2004 |
| WO | WO 2004/079740 | 9/2004 |
| WO | WO 2004/081926 | 9/2004 |
| WO | WO 2004/093035 | 10/2004 |
| WO | WO 2004/100155 | 11/2004 |
| WO | WO 2004/100156 | 11/2004 |
| WO | WO 2005/004123 | 1/2005 |
| WO | WO 2005/004154 | 1/2005 |
| WO | WO 2005/024792 A2 | 3/2005 |

OTHER PUBLICATIONS

Office Action issued Jul. 30, 2008, by the U.S. Patent and Trademark Office in corresponding U.S. Appl. No. 10/670,274.
International Search Report issued Jun. 13, 2007 by WIPO in counterpart International Application No. PCT/KR2005/003021.
USPTO Office Action dated Jan. 19, 2010 for corresponding U.S. Appl. No. 11/083,313.
Office Action issued Jan. 29, 2010 by the Japanese Patent Office in counterpart Japanese Patent Application No. 2007-503837 (with English language translation).
Office Action issued Mar. 25, 2009 by the USPTO in counterpart U.S. Appl. No. 11/083,313.
Office Action issued Mar. 24, 2009 by the USPTO in counterpart U.S. Appl. No. 10/841,516.
Office Action issued May 28, 2010 by the Japanese Patent Office in counterpart Japanese Patent Application No. 2006-507838 (without English language translation).
U.S. Notice of Allowance dated Apr. 28, 2010 for corresponding U.S. Appl. No. 11/083,313.
European Office Action dated Jun. 11, 2010 by the European Patent Office in counterpart Application No. 05721954.5.
Chinese Patent Gazette dated May 26, 2010 for corresponding Application No. 200580026151.3.
Notice of Allowance issued May 14, 2009 by the Russian Patent Office in counterpart Russian Patent Application No. 2005134020/28 (English language translation).
Extended Search Report issued Aug. 20, 2009 by the European Patent Office in counterpart EP 09155333.9.
Office Action issued Aug. 18, 2009 by the Japanese Patent Office in counterpart Japanese Patent Application No. 2006-507838 (with English language translation).
"JIS Handbook Data Processing for Hardware," Japanese Standards Association Inc., Japan, Apr. 21, 1999, pp. 1064-1070.
Search Report issued Jun. 5, 2008 by the European Patent Office in corresponding European Patent Application No. 07110035.8-1247.
Office Action issued Jun. 26, 2008 by the Russian Patent Office in corresponding Russian Patent Application No. 2006104619/28(005004).
Office Action issued Jun. 11, 2008 by the U.S. Patent and Trademark Office in counterpart U.S. Appl. No. 11/797,971.
Office Action issued Jun. 13, 2008 by the U.S. Patent and Trademark Office in counterpart U.S. Appl. No. 10/841,516.
Office Action issued Jun. 18, 2008 by the U.S. Patent and Trademark Office in counterpart U.S. Appl. No. 10/840,264.
Office Action issued Jun. 24, 2008 by the U.S. Patent and Trademark Office in corresponding U.S. Appl. No. 11/147,198.
Office Action issued Jul. 7, 2008 by the U.S. Patent and Trademark Office in corresponding U.S. Appl. No. 10/781,828.
U.S. Office Action dated Sep. 10, 2010 issued in corresponding U.S. Appl. No. 12/506,922.

* cited by examiner

FIG. 4

|  | | 16 addresses | | | | |
|---|---|---|---|---|---|---|
|  | | 0 | 1 | : | S | : | 15 |
| Address Unit Numbers | | $AF_{0,0}$ | $AF_{0,1}$ | : | $AF_{0,S}$ | : | $AF_{0,15}$ |
| | | $AF_{1,0}$ | $AF_{1,1}$ | : | : | : | $AF_{1,15}$ |
| | | : | : | : | : | : | : |
| | | $AF_{3,0}$ | $AF_{3,1}$ | : | $AF_{3,S}$ | : | $AF_{3,15}$ |
| flag bits | | $AF_{4,0}$ | $AF_{4,1}$ | : | $AF_{4,S}$ | : | $AF_{4,15}$ |
| parities | | $AF_{5,0}$ | $AF_{5,1}$ | : | $AF_{5,S}$ | : | $AF_{5,15}$ |
| | | : | : | : | : | : | : |
| | | $AF_{8,0}$ | $AF_{8,1}$ | : | $AF_{8,S}$ | : | $AF_{8,15}$ |

9 bytes

FIG. 5A

| bit<br>byte | $b_7$ | $b_6$ | $b_5$ | $b_4$ | $b_3$ | $b_2$ | $b_1$ | $b_0$ |
|---|---|---|---|---|---|---|---|---|
| $AF_{4,S}$ | Status bits of 0th Data frame | | | | | | | |
| $AF_{4,0}$ | $Sa_{0,1}$ | $Sa_{1,1}$ | $Sa_{0,0}$ | $Sa_{1,0}$ | $IdT_7$ | $Rd_{15}$ | $a_{31}$ | $a_{30}$ |
| $AF_{4,1}$ | $Sa_{2,1}$ | $Sa_{3,1}$ | $Sa_{2,0}$ | $Sa_{3,0}$ | $IdT_6$ | $Rd_{14}$ | $a_{29}$ | $a_{28}$ |
| ⋮ | ⋮ | ⋮ | ⋮ | ⋮ | ⋮ | ⋮ | ⋮ | ⋮ |
| $AF_{4,15}$ | $Sa_{30,1}$ | $Sa_{31,1}$ | $Sa_{30,0}$ | $Sa_{31,0}$ | – | $Rd_0$ | $a_1$ | $a_0$ |

Status bits of 31th Data frame

FIG. 5B

| $Sa_{i,1}, Sa_{i,0}$ | Contents of the $i^{th}$ Data Frame |
|---|---|
| 00b | Original Data(regardless of previous address) |
| 01b | Updated Data if previous address != 0b<br>Real-Time Data if previous address ==0b |
| 10b | Padding Data |
| 11b | Invalid Data |

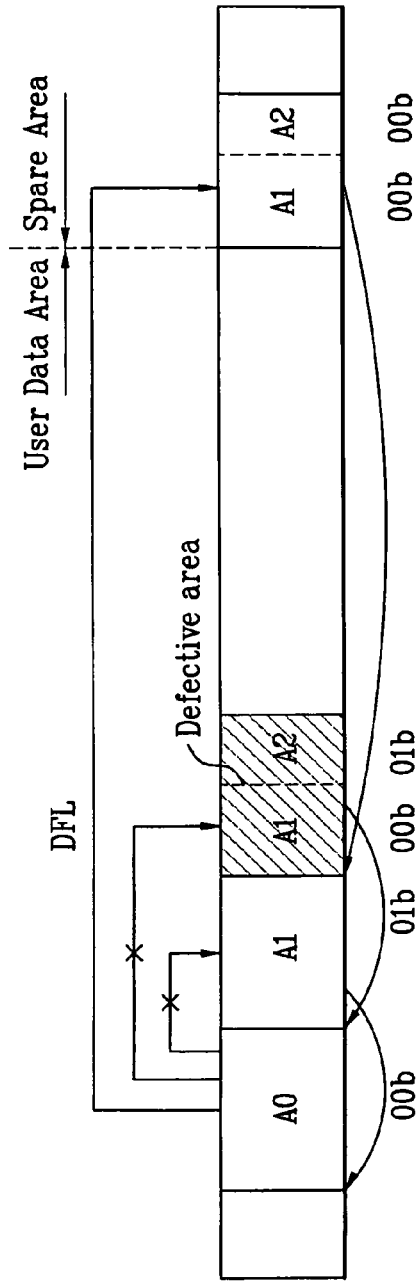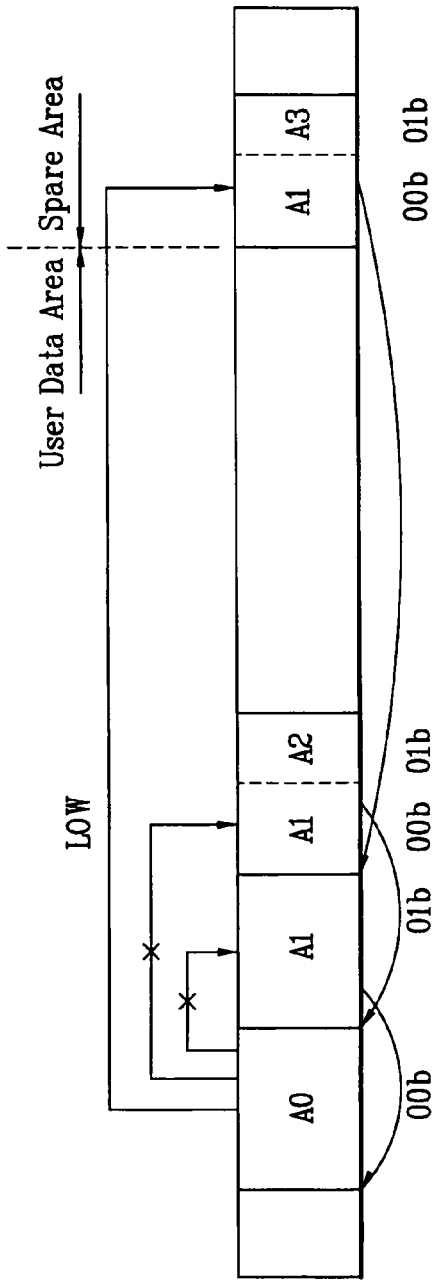

FIG. 7A

| $Sa_{i,1}, Sa_{i,0}$ | Contents of the $i^{th}$ Data Frame |
|---|---|
| 00b | General Data(regardless of previous address) |
| 01b | Real time data |
| 10b | Padding Data |
| 11b | Invalid Data |

FIG. 7B

| One bit of unused previous address in AU | Contents |
|---|---|
| 0b | Original Data(DFL entry) |
| 1b | Updated Data(LOW entry) |

RECORDING MEDIUM, AND METHOD AND APPARATUS OF RECORDING AND REPRODUCING DATA ON THE SAME

This is a continuation application of U.S. application Ser. No. 11/224,107 filed Sep. 13, 2005 now U.S. Pat. No. 7,500,137, the entire contents of which are hereby incorporated by reference. This application also claims the benefit of the U.S. Provisional Application No. 60/609,260, filed on Sep. 14, 2004, in the name of inventor Yong Cheol PARK, entitled "DATA TYPES IN SRM", and No. 60/610,222, filed on Sep. 16, 2004, in the name of inventor Yong Cheol PARK, entitled "DATA TYPES IN BD-R". which are hereby incorporated by reference as if fully set forth herein.

This application claims the benefit of the Korean Patent Application No. 10-2004-0087950, filed on Nov. 1, 2004, which is hereby incorporated by reference as if fully set forth herein.

BACKGROUND OF THE INVENTION

1. Field of the Invention

The present invention relates to a recording medium, and more particularly, to a recording medium, and a method and apparatus of recording and reproducing data on the same.

2. Discussion of the Related Art

Recently, a new type of recording medium, such as a Blu-ray Disc RE-writable (BD-RE), that can record and store high definition audio and video data for a long period of time is expected to be developed and introduced to the recording medium industry and market. As shown in FIG. 1, the BD-RE is allocated with a lead-in area, a data zone, and a lead-out area. An inner spare area (ISA) and an outer spare area (OSA) are respectively allocated at a fore end and a rear end of the data zone. The BD-RE is recorded by cluster units corresponding to a predetermined recording unit. Referring to FIG. 1, whether or not a defect area exists within the data zone can be detected during the recording of the data. When a defect area is detected, a series of replacement recording operations is performed, such as replacement recording the data that is intended to be recorded in the defect area in a spare area (e.g., the inner spare area (ISA)). Then, a position information of the detected defect area and a position information of the replacement recorded spare area are recorded and stored in a defect list (DFL) within the lead-in area as management information.

Therefore, since the data that is intended to be recorded in the defect area is replacement recorded in the spare area, the data replacement recorded in the spare area is read and reproduced, instead of the data of the defect area, thereby preventing in advance a data recording/reproducing error from occurring. Meanwhile, the write-once blu-ray disc (BD-WO) has recently been under development. However, since data can only be recorded once in the entire area of the optical disc, unlike the re-writable optical disc, data cannot be physically overwritten in the write-once optical disc. Nevertheless, there may occur instances, in the write-once optical disc, where the recorded data is wished to be edited or partially modified, and, for simplicity of usage from the part of the host or the user, overwriting of the data may be required. Accordingly, an efficient method enabling such defect management to be overwritten is urgently required.

SUMMARY OF THE INVENTION

Accordingly, the present invention is directed to a recording medium, and a method and apparatus of recording and reproducing data on the same that substantially obviate one or more problems due to limitations and disadvantages of the related art.

An object of the present invention is to provide an efficient method for recording and reproducing the recording medium.

Another object of the present invention is to provide a method for overwriting data within the recording medium and a method for managing a defect area.

A further object of the present invention is to provide a recording medium allowing the various methods described above to be performed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording data on a recording medium includes recording data within a plurality of data frames included in a cluster, respectively, recording status information within the cluster for each data frame, the status information indicating a status of the data recorded in each data frame, and recording previous location information within the cluster when the cluster is determined to be a replacement cluster, the previous location information indicating a previous location of an original cluster associated with the replacement cluster.

In another aspect of the present invention, a method of reproducing a cluster recorded on a recording medium, the cluster having a plurality of data frames, includes extracting status information from the cluster, the status information indicating a status of data recorded in each data frame, and reproducing the data recorded in each data frame based upon the extracted status information, wherein the status information indicates that the data recorded in each data frame represents any one of valid data, real-time data, padding data, and invalid data.

In another aspect of the present invention, an apparatus of recording data on a recording medium including a cluster having a plurality of data frames, includes a pickup unit for recording data in the data frames, respectively, and a microcomputer for controlling the pickup unit to record status information within the cluster, the status information indicating a status of the data being recorded in each data frame, wherein the microcomputer further controls the pickup unit to record previous location information within the cluster when the cluster is determined to be a replacement cluster, the previous location information indicating a previous location of an original cluster associated within the replacement cluster.

In another aspect of the present invention, an apparatus of reproducing a cluster recorded on a recording medium, the cluster having a plurality of data frames, includes a pickup unit for reproducing data recorded in the data frames, and a microcomputer for controlling the pickup unit to extract status information from the cluster and to reproduce data recorded in each data frame based upon the extracted status information, wherein the status information indicates that the data recorded in each data frame represents any one of valid data, real-time data, padding data, and invalid data.

In a further aspect of the present invention, a recording medium includes a plurality of clusters, each cluster including a first data area including a plurality of data frames, a second data area including status information for each data frame, the status information indicating a status of the data recorded in each data frame, and a third data area including previous location information when each cluster is determined to be a replacement cluster, the previous location information indicating a previous location of an original cluster associated with the replacement cluster.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 4 illustrates a main field of the write-once optical disc according to the present invention;

FIGS. 5A and 5B illustrate a method for recording a flag bit and status information according to the present invention;

FIGS. 6A to 6D illustrate a method for recording data on the write-once optical disc according to an embodiment of the present invention;

FIGS. 7A and 7B illustrate a method for recording a data frame status bit according to another embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

Figure 1:
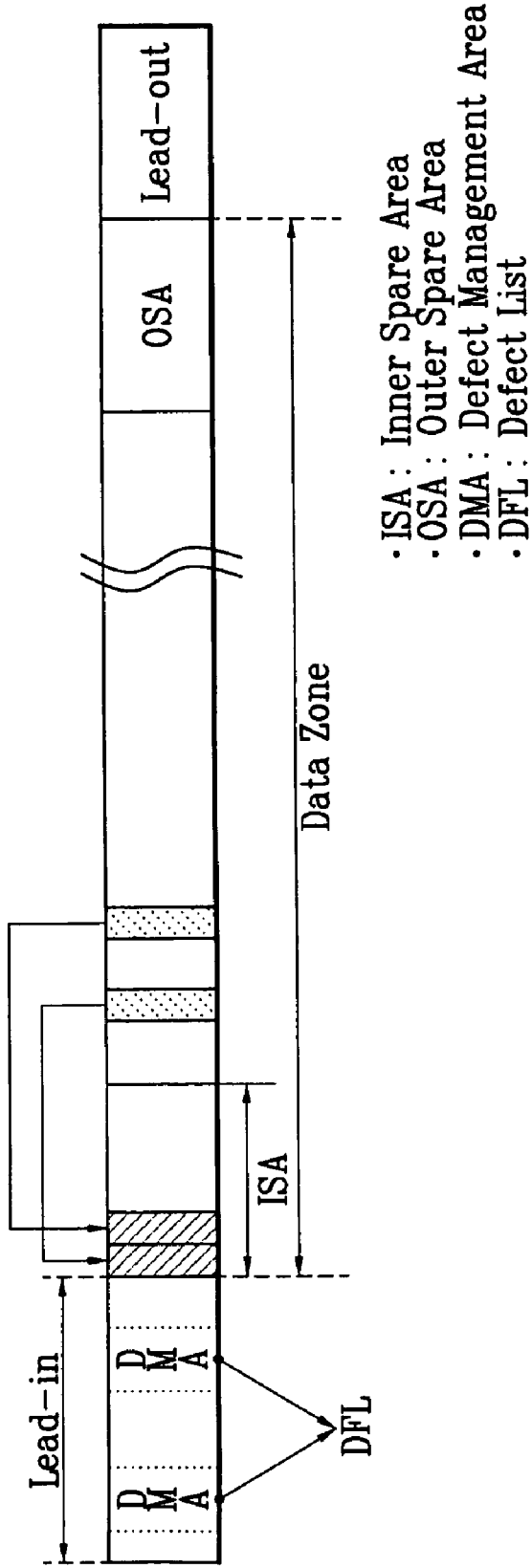
FIG. 1 illustrates a method for managing defects in a general re-writable optical disc.
Figure 2:
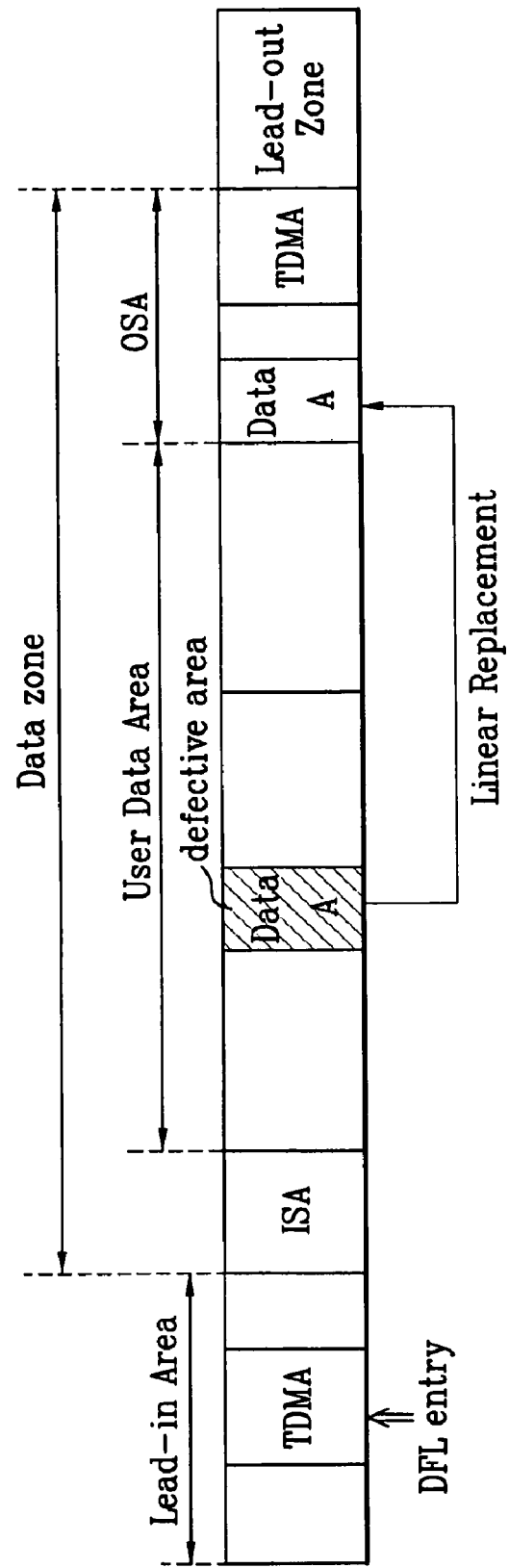
FIG. 2 illustrates a method for managing defects in the write-once optical disc according to the present invention.

FIG. 2 illustrates a method for managing defects in the write-once optical disc according to the present invention. Referring to FIG. 2, the write-once high density optical disc is allocated with a lead-in area, a data zone, and a lead-out area. Additionally, the data zone includes an inner spare area (ISA), an outer spare area (OSA), and a user data area. Herein, the user data area is where the user data is actually recorded. Also, the lead-in area is used as an area for recording diverse management information for recording/reproducing data on/from the optical disc. Moreover, the lead-in area is provided with a temporary disc management area (TDMA), which is an area for recording defect management information and recording management information of the optical disc. The TDMA may be allocated with a separate Additional TDMA within a spare area for defects that may frequently occur during the use of the optical disc and for updating the recording management information.

A defective area may be detected while recording or reproducing data on or from the write-once optical disc having the above-described structure. At this point, the defect area also includes an area which is presently not a defective area but which is liable to be defective in the near future. The defective area may occur due to a contamination or a scratch on the surface of the optical disc. And, when such defective area occurs, the data that is to be or that is already recorded in the data area is replacement recorded on the spare area. After replacement recording data on the spare area, a position information of the defective area and the replacement area are recorded in the TDMA as a defect list (DFL) entry. Therefore, when reproducing the recorded data in a later process, an apparatus for reproducing the optical disc refers to the DFL entry information so as to reproduce the data recorded in the replacement area instead of the defective area, thereby ensuring security and reliability of the data.

Figure 3:
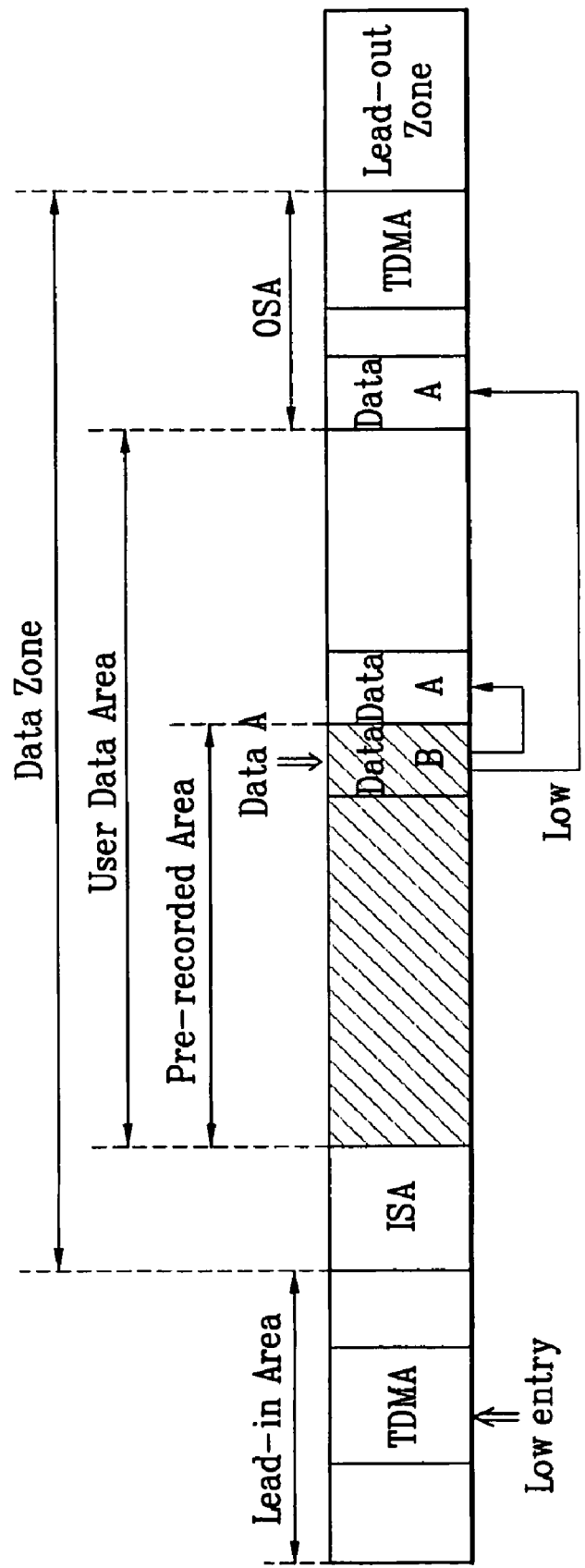
FIG. 3 illustrates a logical overwriting method in a write-once optical disc according to the present invention.

As described in the method for managing defects in the write-once optical disc, when overwriting data on a data recorded area, the data that is intended to be recorded on a recorded area is replacement recorded on a recordable area within the user data area or on a spare area. FIG. 3 illustrates a logical overwriting method in a write-once optical disc according to the present invention. Referring to FIG. 3, in the write-once optical disc, according to a request made by a host or an application, a new set of data may be sought to be recorded in the user data area, in which data is already recorded. However, due to the characteristics of the write-once optical disc, a physical overwriting of data cannot be performed on a pre-recorded area of the optical disc.

Therefore, in this case, a method for replacement recording data that is intended to be recorded in the pre-recorded area on the user data area or the spare area will be used. More specifically, instead of recording data on the pre-recorded area, which cannot be physically overwritten, data may be replacement recorded either on a next recordable user data area or on a spare area. This method will be referred to as Logical OverWriting (LOW) in order to be distinguished from physical overwriting of the rewritable optical disc. After performing the replacement recording, the replacement recorded position is recorded in the TDMA as an entry information. Therefore, when reproducing the data in a later process, reference is made to the entry information recorded in the TDMA in order to reproduce the replacement recorded data. Herein, the entry in which the position information of the logical overwriting area and the replacement area is referred to as a LOW entry.

When performing the logical overwriting or the defect management, as described above, the corresponding position information is recorded as an entry. However, apart from such method, information associated with the recording of the data may also be recorded in each cluster in sector units. Herein, data is recorded in each cluster. Such method will be described in detail with reference to FIG. 4.

FIG. 4 illustrates a main field of the write-once optical disc according to the present invention. Referring to FIG. 4, in order to facilitate the recording or reproduction of the data on/from the optical disc, an address field (AF) is included in each cluster existing within the optical disc. The address field (AF) divides each of the clusters into 16 addresses. Each address includes a plurality of address units. Each address unit has the size of 1 byte, and one address field is recorded in the size of 9 address units (i.e., 9 bytes). Each of the address fields is divided into an area for recording address unit numbers ($AF_{0,S}$ to $AF_{3,S}$) having the size of 4 bytes, an area for flag bits ($AF_{4,S}$), and an area for parity bits ($AF_{5,S}$ to $AF_{8,S}$). The area for recording address unit numbers has the size of 4 bytes, and the area for the flag bits has the size of 1 byte. The area for the parity bits, which is for correcting errors, has the size of 4 bytes. At this point, the flag bit area ($AF_4$,S) includes the status of each data frame within the cluster and also includes the address information of a previous recorded area, when the corresponding area is a replacement area. This will be described in detail with reference to FIGS. 5A and 5B. Herein, a cluster consists of 32 frames (herein, a frame is identical to a sector).

FIGS. 5A and 5B illustrate a method for recording a flag bit and status information according to the present invention. FIG. 5A illustrates a structure of a flag bit $AF_{4,S}$. Referring to FIG. 5A, one $AF_{4,S}$ consists of 8 bits. Herein, bits $b_7$ to $b_4$ are areas in which the status of the corresponding frame is recorded. If bits $b_1$ and $b_0$ are replacement clusters, these bits are used as areas in which the address of a previous recorded area is recorded. More specifically, in the flag bit area which consists of the area from $AF_{4,0}$ to $AF_{4,15}$, the bits in which the address of the previous recorded area is recorded are from $a_{31}$ to $a_0$. A first physical sector number (PSN) of the previous recorded area is recorded in the above-described bits. At this point, if the corresponding cluster is not a replacement area, the bit is recorded as 0 bit. In addition, in the flag bit area $AF_{4,0}$ to $AF_{4,15}$, status bits in which the status of the corresponding frame is recorded consists of in the flag bit area which consists of the area from $AF_{4,0}$ to $AF_{4,15}$ and in the flag bit area which consists of $Sa_{0,1}$ to $Sa_{31,1}$ and $Sa_{0,0}$ to $Sa_{31,0}$. Herein, each $Sa_{i,1}$ and $Sa_{i,0}$ form a pair of 2 bits so as to represent the status information of a corresponding frame among a total of 32 frames. For example, the $Sa_{0,1}$ and $Sa_{0,0}$ pair indicates the status information of the $0^{th}$ frame of the corresponding cluster, and the $Sa_{31,1}$ and $Sa_{31,0}$ pair indicates the status information of the $31^{st}$ frame of the corresponding cluster.

FIG. 5B illustrates the status information. And, the method for recording the status information will be described in detail with reference to FIG. 5B. Referring to FIG. 5B, when the status bits $Sa_{i,1}$ and $Sa_{i,0}$ are 00b, this indicates that the corresponding frame is an original data. At this point, whether the address of the previous recorded area is recorded or not is not taken into account. This is because the data recorded in the replacement area may be the original data, if the data intended to be recorded in the defective area is replacement recorded in accordance with the method for managing defects.

When the status bit is 01b, the data may be an updated version of the corresponding frame, when the status bit is 01b, and the bit in which the address of the previous recorded area is not 0b (i.e., when the address of the previous recorded area is recorded). The logical overwriting is taken into account in this case. In other words, in logical overwriting, a new set of data different from the previously recorded data is replacement recorded. Therefore, in order to distinguish the data from the replacement recorded original data performed for the defect management, the data is indicated as updated data.

Alternatively, when the status bit is 01b, and when the bit in which the address of the previous recorded area is 0b, the corresponding cluster is not replacement recorded, and the status of the corresponding frame is real-time data (which is also referred to as "streaming data"). This is to distinguish the data from the general non-real time data. When the data is real-time data, replacement recording is generally not performed in order to provide seamless recording or reproduction of the data. Meanwhile, when the status bit is 10b, this indicates that the corresponding frame is meaningless padding data. And, when the status bit is 11b, this indicates that the corresponding frame in invalid data. As described above, by recording information on the status of data frame within the cluster and also the address of a previous recorded area, when the corresponding area is a replacement area, the original data or the updated data can be easily identified and search, even when the DFL entry or the LOW entry is absent or unknown. Examples will be given with reference to the accompanying drawings.

Figure 6A:
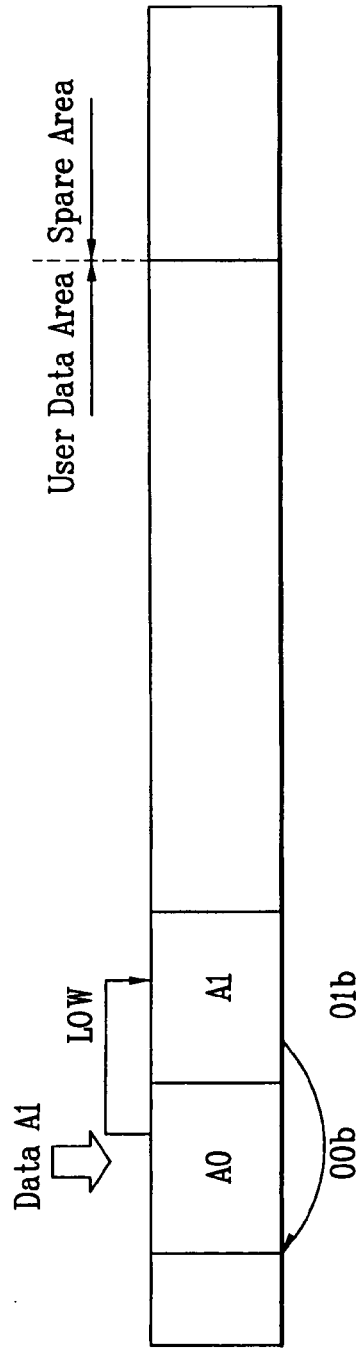

FIGS. 6A to 6D illustrate a method for recording data on the write-once optical disc according to an embodiment of the present invention. Referring to FIG. 6A, when a recording (or writing) command for data A1 is transmitted to an area in which data A0 is recorded, in accordance with the request from an application or host, data A1 is replacement recorded in a next recordable area. Then, its position information is recorded in the TDMA as a LOW entry. At this point, the data is recorded in cluster units. Herein, FIG. 6A illustrates an example of data A0 and data A1 each having the size of one cluster and being non real-time data. In this case, since data A0 is the original data, 00b bit is recorded as the status bit included in the flag bit within the cluster in which data A0 is recorded. Herein, as described above, 00b indicates that the data in the original data.

In addition, the cluster in which data A1 is recorded is a replacement area. Therefore, a first PSN of the previous recorded area of data A0 is recorded in the flag bit. When the address of the previous recorded area is included and when a new data A1 is updated, the status bit is recorded as 01b. Since it is assumed that data A1 has the size of one cluster, the bits indicating the status of all 32 frames within the cluster are all recorded as 01b.

Figure 6B:
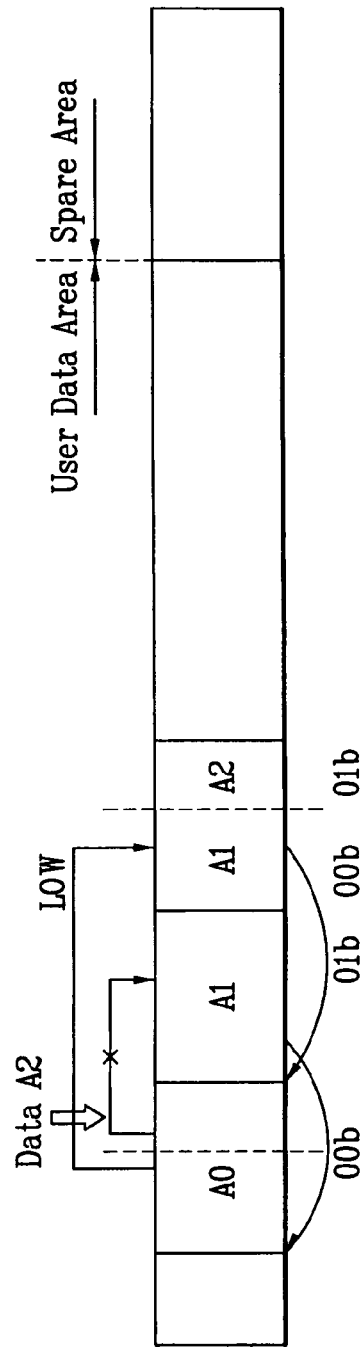

Alternatively, a recording (or writing) command for data A2 may be transmitted in accordance with the request from an application or host on the optical disc in which logical overwriting has been performed, as shown in FIG. 6B. In this example, the size of data A2 is smaller than one cluster, and the recording command is transmitted for a partial area of the cluster in which data A0 is recorded. Referring to FIG. 6B, when the recording command for data A2 is for a part of the area in which data A0 is recorded, the area in which data A0 is recorded is identified as the area in which A1 is recorded. Therefore, a portion of data A1 and the data A2 are replacement recorded on a next recordable area, and its position information is recorded as the LOW entry.

As described above, data is recorded in cluster units. Therefore, being smaller than one cluster unit, data A2 cannot be replacement recorded by itself. In this case, the first PSN of the cluster in which data A1 is recorded is recorded in the flag bit of the cluster in which the portion of data A1 and the data A2 are recorded. Also, bit 00b is recorded as the status bit of the frame in which a portion of data A1 is recorded. Herein, 00b indicates that the data is the original data. Furthermore, since the status bit includes the address of the previous recorded area and is updated, bit 01b is recorded as the status bit of the frame in which data A2 is replacement recorded. Meanwhile, in this case, since the LOW entry performed in FIG. 6A becomes a set of meaningless information due to the replacement recording of data A2, the recorded LOW entry of FIG. 6A is deleted from the entry.

Accordingly, in the optical disc in which logical overwriting has been performed, a defect may occur in the cluster where the portion of data A1 and the data A2 are replacement recorded. This will be described in detail with reference to FIG. 6C. Referring to FIG. 6C, when a defect occurs in the cluster where the portion of data A1 and the data A2 are replacement recorded, the portion of data A1 and the data A2 are once again replacement recorded in a spare area, and their position information is recorded as a DFL entry. At this point, the replacement recorded portion of data A1 and data A2 are identified as data recorded in the area in which data A0 is originally recorded. Accordingly, the position information of the data A0 area and the position information of the replacement recorded spare area are recorded as the position information of the DFL entry. Therefore, the two previously recorded LOW entry information become meaningless information and are, thus, deleted from the entry. The first PSN of the previous replacement recorded area is recorded in the flag bit within the cluster of the spare area in which the portion of data A1 and the data A2 are replacement recorded.

Furthermore, since the original data is replacement recorded as a means of defect management, bit 00b is recorded as the status bit, which indicates the status of the cluster of the spare area in which the portion of data A1 and the data A2 are replacement recorded. Herein, bit 00b indicates that the data is the original data regardless of whether the data includes the address of the previous recorded area.

FIG. 6D illustrates an example of a new data A3 being replacement recorded in an area which is identified to have data A2 recorded therein. Referring to FIG. 6D, when a recording (or writing) command for data A3 is transmitted, in accordance with the request from an application or host, to part of the data A0 area which is identified to have data A2 recorded therein, data A1 and data A3 are replacement recorded on a spare area, and their position information are recorded as the LOW entry. In case of the logical overwriting, the replacement recording of data may be performed on a next recordable area of the user data area or on a spare area. Therefore, FIG. 6D illustrates an example of performing logical overwriting on the spare area.

When the replacement recording of data of the logical overwriting is performed on the spare area, the first PSN of the previous recorded data is recorded in the flag bit of the cluster is which the portion of data A1 and the data A3 are replacement recorded. And, bit 00b indicating that the data is the original data is recorded as the status bit of the frame in which the portion of data A1 is recorded. Further, since the status bit included the address of the previous recorded area and is updated, bit 01b is recorded as the status bit of the frame in which data A3 is replacement recorded. As described above, by recording the address of the previous recorded area and the status of the replacement recorded data, the area in which the original data is recorded and its status information can be known even when the LOW entry or the DFL entry are unknown. This also means that the LOW entry and the DFL entry are not required to be separately defined. Moreover, the data can be managed more stably.

FIGS. 7A and 7B illustrate a method for recording a data frame status bit according to another embodiment of the present invention. Referring to FIG. 7A, when the status bit indicating the status of a data frame is 00b, this indicates that the data is general data regardless of whether the data includes the address of the previous recorded data area. Status bit 01b indicates that the data is real-time data, 10b indicates that the data is padding data, and 11b indicates that the data is invalid data. More specifically, the status bit of the data frame does not distinguish whether the data is the original data or updated data. Instead, the status bit only indicates whether the data is general data or real-time data. Therefore, among the bits including the address of the previous recorded data area, one of the bits is used to distinguish whether the data is the original data or the updated data. This will be described in more detail with reference to FIG. 7B.

Referring to FIG. 7B, among the above-described flag bits, more specifically, among the 32 bits including the address of the previous recorded area, one of the bits is allocated for distinguishing the original data from the updated data. When the bit is '0', the corresponding cluster represents the original data, and when the bit is '1', the corresponding cluster represents the updated data. At this point, since the bit allocated for distinguishing the original data from the updated data is one of bits having the address of the previous recorded area recorded therein, the bit indicates whether the data is the original data or the updated data by cluster units. This will be described in more detail with reference to FIG. 8.

Figure 8:
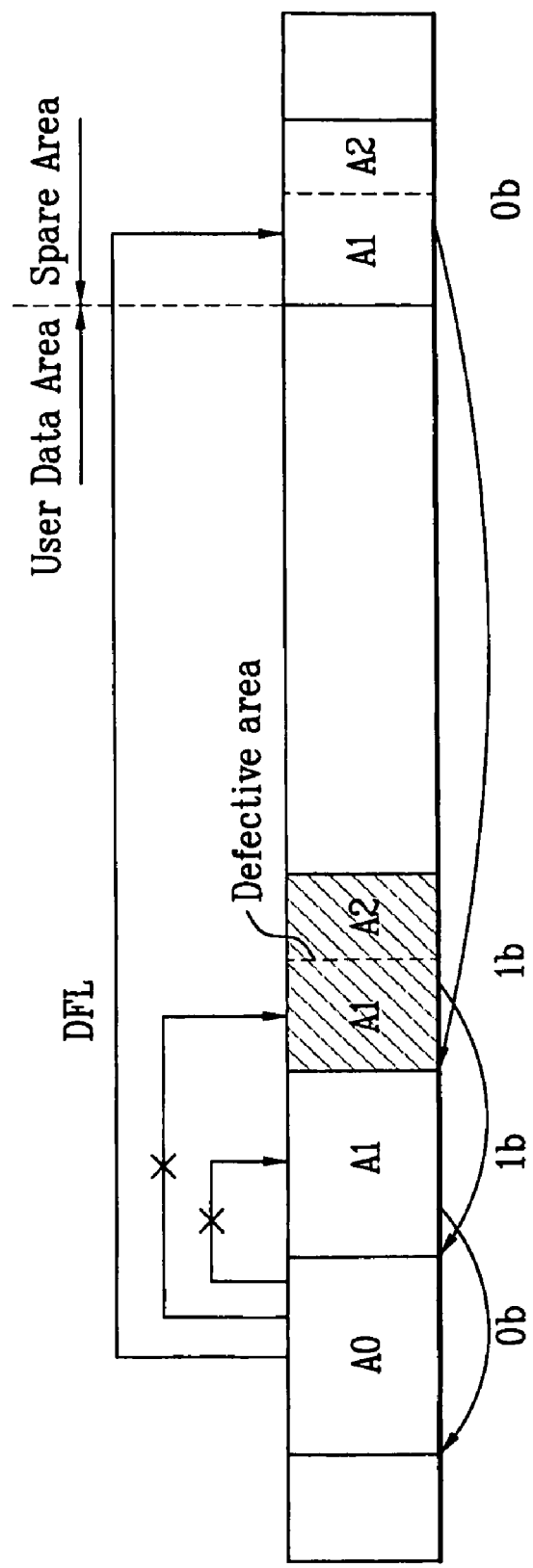
FIG. 8 illustrates a method for recording data on the write-once optical disc according to the other embodiment of the present invention.

FIG. 8 illustrates a method for recording data on the write-once optical disc according to the other embodiment of the present invention. Referring to FIG. 8, when a command for recording (or writing) data A1 on the area, in which data A0 is recorded, is first transmitted, the data A1 is replacement recorded on a next recordable area, which is then recorded as a LOW entry. At this point, a first physical sector number (PSN) of the area, in which the data A0 is recorded, is recorded in the area having the address of the previous recorded area recorded therein. In addition, one bit is allocated and recorded in the area having the data A0 recorded therein, so as to indicate that the logically overwritten data A1 is an updated data.

Moreover, when a command for recording data A2, which is smaller than one cluster unit, on the area identified to have the data A1 recorded therein is transmitted, a portion of data A1 and the data A2 are replacement recorded on a next recordable area. The replacement recorded data is then recorded in the TDMA as a LOW entry, and the previously recorded LOW entry is deleted. At this point, the first PSN of the area having the data A1 recorded therein and 1 bit indicating that the recorded data is an updated data are recorded in the area having the address of the area preceding the replacement area recorded therein. Thereafter, if the area having the portion of data A1 and the data A2 recorded therein is detected as a defective area, the corresponding data are replacement recorded on a spare area and the corresponding location information is recorded in the TDMA as the DFL entry. At this point, 0 bit and the first PSN of the defective area are recorded in the bit including the address of the recorded area preceding the area, in which the portion of data A1 and the data A2 are replacement recorded. Herein, '0 bit' indicates that the data is the original data.

Figure 9:
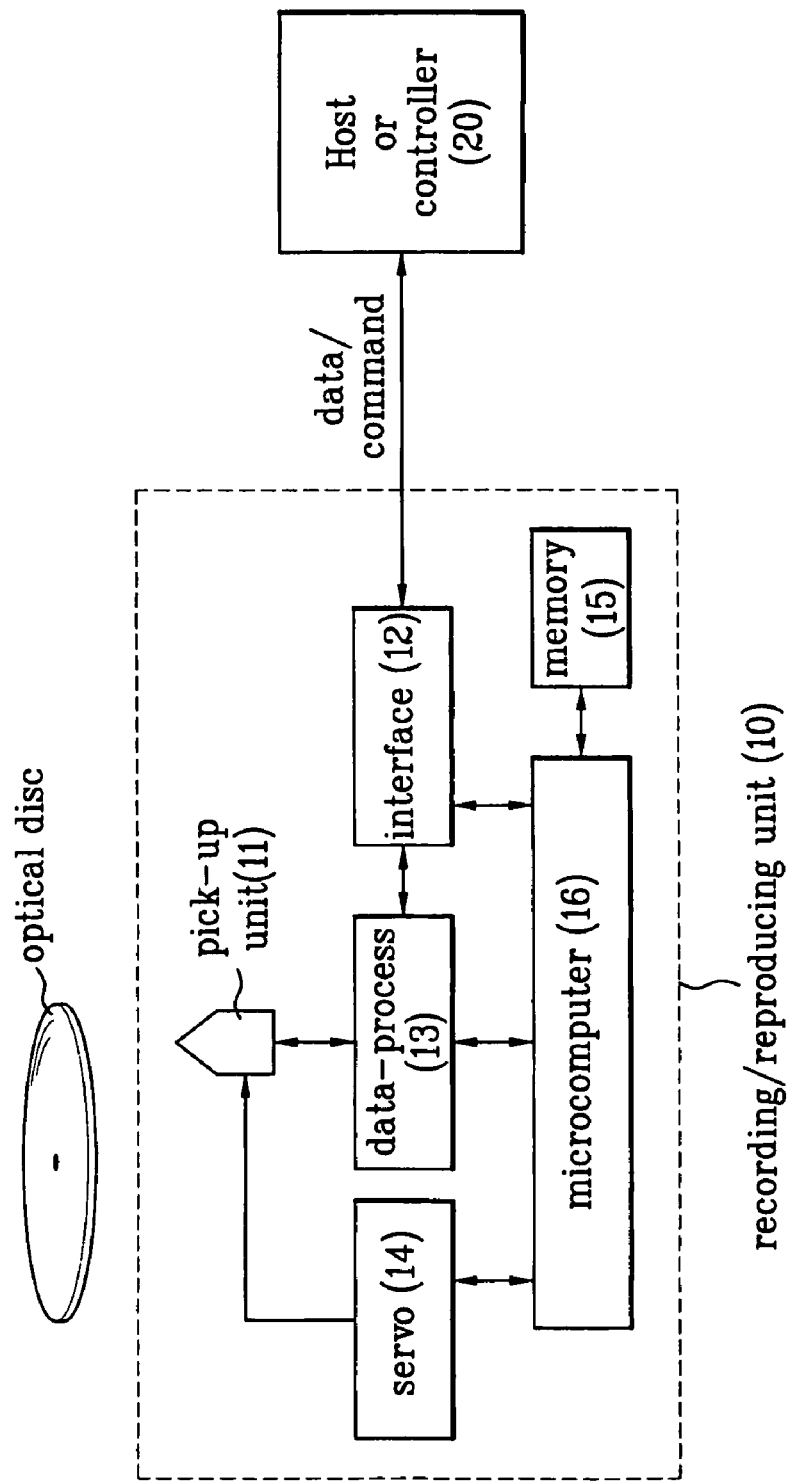
FIG. 9 illustrates a block diagram of an optical recording and reproducing apparatus according to the present invention.

FIG. 9 illustrates a block diagram of an optical recording and/or reproducing apparatus according to the present invention. Referring to FIG. 9, the optical recording and/or reproducing apparatus includes a recording/reproducing device 10 for performing recording/reproduction on the optical disc, and a host, or controller 20 for controlling the recording/reproducing device 10. In the optical recording and/or reproducing apparatus having the above-described structure, the host 20 gives a writing or reproduction order to write or reproduce to/from a particular area of the optical disc to the recording/reproducing device 10, and the recording/reproducing device 10 performs the recording/reproduction in response to the order from the host 20. The recording/reproducing device 10 includes an interface unit 12 for performing communication, such as exchange of data and order, with the host 20, a pickup unit 11 for writing/reading a data to/from the optical disc directly, a data processor 13 for receiving signal from the pickup unit 11, and recovering a desired signal value, or modulating a signal to be written into a signal able to be written on the optical disc, and forwarding, a servo unit 14 for controlling the pickup unit 11 to read a signal from the optical disc accurately, or write a signal on the optical disc accurately, a memory 15 for temporary storage of various kinds of information including management information, and data, and a microcomputer 16 for controlling various parts of the recording/reproducing device 10.

In the optical recording and/or reproducing apparatus, process steps of the method for recording data on the write-once optical disc will now be described. Upon inserting the write-once optical disc into the optical recording and/or reproducing apparatus, all management information is read from the optical disc and stored in the memory 15 of the recording/reproducing device 10, for use at the time of recording/reproduction of the optical disc. Herein, if the user desires to write on a particular area of the optical disc, the host 20, which considers such desire of the user as a writing command, provides information on a desired writing position to the recording/reproducing device 10, along with a set of data that is to be written.

After receiving the recording command, the microcomputer 16 included in the recording/reproducing device 10 is controlled to perform the recording of data on the optical disc in accordance with the recording command. When defect management or overwriting is required during the recording of data, the data that is intended to be recorded on the defective area or the overwriting area is replacement recorded on a next recordable area or on a spare area. Then, the corresponding position information is recorded in the TDMA as one of a LOW entry and a DFL entry.

The status of the data is recorded in frame units of the replacement area in a status bit within the flag bit of an address unit (AU) of the replacement area. And, a first PSN of the previous recorded area is recorded in the area having the address of the previous recorded area recorded therein. Depending upon the diverse embodiments of the present invention, one of the bits of the area having the address of the previous recorded area recorded therein is used for distinguishing whether the replacement recorded data is the original data or an updated data. In order to do so, the microcomputer 16 included in the recording/reproducing device 10 transmits the position information of the replacement area and the data to the servo 14 and the data processor 13. Thereafter, the microcomputer 16 allows the recording or replacement recording of the data to be completed at a desired position of the optical disc through the pickup unit 11.

The method for reproducing the above-described write-once optical disc will now be described. When the data recorded write-once optical disc is first inserted in the recording and/or reproducing apparatus, all management information recorded in the disc are read and stored in the memory 15 of the recording/reproducing device 10. These management information are then used later on when recording and/or reproducing data on/from the optical disc. Thereafter, when the user wishes to reproduce a specific area of the optical disc, the host 20 creates a reproducing (or reading) command based on the user's request and transmits the position information of the desired area to the recording/reproducing device 10. After receiving the reproducing command, the microcomputer 16 included in the recording/reproducing device 10 receives the reproducing command, the microcomputer 16 determines whether the area of the optical disc, which the host 20 wishes to reproduce, has been replacement recorded on another area within the data area. As described above, this can be verified by the LOW and DFL entries recorded in the TDMA. Furthermore, necessary information may be verified by using the status bit recorded in the flag bit within the address unit of the replacement area or the bit having the address of the previous recorded area. Therefore, when the area which the host 20 wishes to reproduce has not been replacement recorded, the microcomputer 16 reproduces the corresponding area and transmits the information of the reproduced area to the host 20. Alternatively, if the area has been replacement recorded on another area, the microcomputer 16 refers to the LOW or DFL entry information and the flag bit within the address unit, so as to reproduce the replacement recorded area and to transmit the corresponding information to the host 20.

As described above, the recording medium, and the method and apparatus of recording and reproducing data on the same have the following advantages. By verifying the status of the recorded data and the address of a previous recorded area, the data can be more stably and securely managed, and the efficiency for recording and/or reproducing on/from the recording medium can be enhanced.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of recording data on a recording medium, the method comprising:
    recording into a cluster a plurality of data frames and address information, where the address information includes a plurality of flag bits representing status information indicating a status of each of data frames and previous location information indicating a physical address of a previous cluster replaced by the cluster,
    wherein if the cluster is an original cluster replacing no cluster the previous location information is set to zero.

2. The method of claim 1, further comprising:
    recording an entry indicating each position of the cluster and the previous cluster replaced by the cluster into a temporary defect management area of the recording medium in case that the cluster is a replacement cluster replacing the previous cluster.

3. The method of claim 1, wherein the status information indicates which data among valid general data, valid non-general data, padding data, and invalid data is contained in each of the data frames.

4. The method of claim 1, wherein the address information includes a total of 16 address unit numbers and error-correction parities for each address unit number.

5. The method of claim 1, wherein the status information for each of the data frames is represented by two flag bits.

6. The method of claim 1, wherein the address information further includes first identification information identifying whether the cluster contains original data by a defective area detection or contains logical overwriting data by a logical overwrite.

7. The method of claim 6, wherein a plurality of flag bits further comprises second identification information identifying that the cluster is an original cluster replacing no cluster or a replacement cluster by the defective area detection or the logical overwrite.

8. The method of claim 1, wherein the address information further includes first identification information identifying whether the cluster is an original cluster replacing no cluster or a replacement cluster by a defective area detection or a logical overwrite.

9. A method of reproducing data recorded on a recording medium, the method comprising:

extracting a plurality of data frames and address information from a cluster, the address information including status information indicating a status of each of the data frames and previous location information indicating a physical address of a previous cluster replaced by the cluster, wherein if the cluster is an original cluster replacing no cluster the previous location information is set to zero; and reproducing data contained in each of the data frames based upon the status information.

10. The method of claim 9, further comprising:

reproducing an entry indicating each position of the cluster and the previous cluster replaced by the cluster from a temporary defect management area of the recording medium in case that the cluster is a replacement cluster replacing the previous cluster.

11. The method of claim 9, wherein the status information indicates which data among valid general data, valid non-general data, padding data and invalid data is contained in each of data frames.

12. The method of claim 11, wherein, if the status information indicates that data contained in a data frame indicates the valid data, an entire portion of the data frame is reproduced.

13. The method of claim 11, further comprising:

if the status information indicates that data contained in a data frame is the padding data, discarding the data contained the data frame.

14. The method of claim 11, further comprising:

when the status information indicates that data contained in a data frame is the invalid data, reproducing data from the previous cluster indicated by the previous location information.

15. An apparatus of recording data on a recording medium, the apparatus comprising:

a pickup configured to record into the recording medium; and a microcomputer operatively coupled to the pickup and configured to control the pickup to record a plurality of data frames and address information into a cluster of the recording medium, where the address information includes status information and previous location information, the status information indicating a status of each of the data frames and the previous location information indicating a physical address of a previous cluster replaced by the cluster, wherein if the cluster is an original cluster replacing no cluster the previous location information is set to zero.

16. The apparatus of claim 15, wherein the microcomputer is configured to control the pickup to record an entry indicating each position of the cluster and the previous cluster replaced by the cluster into a temporary defect management area of the recording medium in case that the cluster is a replacement cluster replacing the previous cluster.

17. The apparatus of claim 15, wherein the status information indicates which data among valid general data, valid non-general data, padding data, and invalid data is contained in each of the data frames.

18. The apparatus of claim 15, wherein the status information indicates which data among valid data, updated data, padding data, and invalid data is contained each of the data frames.

19. The apparatus of claim 15, wherein the address information further includes a total of 16 address unit numbers and error-correction parities for each of the address unit numbers.

20. An apparatus of reproducing data recorded on a recording medium, the apparatus comprising:

a pickup configured to reproduce data from the recording medium; and a microcomputer operatively coupled to the pickup and configured to control the pickup to extract a plurality of data frames and address information from a cluster of the recording medium, where the address information includes status information a status of each of the data frames and previous location information indicating a physical address of a previous cluster replaced by the cluster, wherein if the cluster is an original cluster replacing no cluster the previous location information is set to zero; and control data contained each of the data frames to be reproduced based on the status information.

21. The apparatus of claim 20, wherein the microcomputer is configured to control the pickup to reproduce an entry indicating each position of the cluster and the previous cluster replaced by the cluster from a temporary defect management area of the recording medium in case that the cluster is a replacement cluster replacing the previous cluster.

22. The apparatus of claim 20, wherein the status information indicates which data among valid data, padding data and invalid data is contained in each of the data frames.

23. The apparatus of claim 22, wherein if the status information indicates that data contained in a data frame is the valid data, an entire portion of the data frame is reproduced.

24. The apparatus of claim 23, wherein if the status information indicates that data contained in a data frame is the padding data, the data contained the data frame is discarded.

25. The apparatus of claim 23, wherein if the status information indicates that data contained in a data frame is the invalid data, the microcomputer is configured to control the pickup to reproduce data from the previous cluster indicated by the previous location information.

26. A recording medium comprising:

a plurality of clusters, each cluster comprising:

a plurality of data frames and address information where the address information includes status information and previous location information;

the status information indicating a status of each of data frames; and the previous location information indicating a physical address of a previous cluster replaced by the cluster, wherein if the cluster is an original cluster replacing no cluster the previous location information is set to zero.

27. The recording medium of claim 26, wherein the status information indicates which data among valid general data, valid non-general data, padding data and invalid data is contained in each of the data frames.

28. The recording medium of claim 26, wherein the status information indicates which data among valid data, updated data, padding data and invalid data is contained each of the data frames.

29. The recording medium of claim 26, wherein the address information further includes a total of 16 address unit numbers and error-correction parities for each of the address unit numbers.

* * * * *